3,267,170
PROCESS FOR FORMING OLEFINS BY HYDROGEN TRANSFER

Clyde Lee Aldridge, Rouen, Seine Maritime, France, and James Arthur Rigney, Baton Rouge, La., assignors to Esso Research and Engineering Company, a corporation of Delaware
No Drawing. Filed June 30, 1964, Ser. No. 379,379
17 Claims. (Cl. 260—683.3)

The present invention relates to an improved catalyst for use in a process for the transfer of combined hydrogen from one type of hydrocarbon to another type of hydrocarbon. More particularly, the present invention relates to a process of converting a hydrocarbon having at least three carbon atoms per molecule and containing non-aromatic carbon-to-hydrogen bonds to a different hydrocarbon having a higher carbon-to-hydrogen ratio by interaction with a hydrogen accepting olefin in the presence of certain new and useful catalysts.

It has been found that the conversion of a hydrocarbon having at least three carbon atoms per molecule can be effected by adding to the charged hydrocarbon a substantial amount of a hydrogen accepting olefin in the presence of a suitable catalyst. The olefin utilized is ultimately converted to a saturated hydrocarbon by addition of the hydrogen removed from the charged hydrocarbon while the latter is converted in the process to a compound having a higher carbon-to-hydrogen ratio. This conversion of hydrocarbons to compounds having a higher carbon-to-hydrogen ratio is desirable since the starting materials utilized are presently available in both quantity and quality at low cost. The advantage of this accomplishment is readily apparent if one considers the value of the ability of almost complete utilization of the gaseous byproducts encountered from both the straight and the destructive distillation of petroleum.

While the conversion of hydrocarbons to olefins by hydrogen transfer, without the concurrent cracking and other side reactions, is highly desirable, it has been found that certain undesirable features are inherent in the processes known to the art. For example, previous attempts to dehydrogenate paraffin feedstocks used in such reactions have been unattractive because in order for the thermodynamics of hydrogen loss to become favorable, high temperatures must be employed. Thus, in the dehydrogenation of n-hexane to trans-2-hexene it is necessary to utilize elevated temperatures as high as approximately 1150° F. before the free energy of this conversion ceases to be positive. For example:

n-Hexane→trans-2-hexene+$H_2$
 $\Delta°$ F. @ 800° F. (700° K.) = +6.5 kcal./mole
n-Hexane→trans-2-hexene+$H_2$
 $\Delta°$ F. @ 900° F. (755° K.) = +4.9 kcal./mole
n-Hexane→trans-2-hexene+$H_2$
 $\Delta°$ F. @ 1150° F. (894° K.) = +0.4 kcal./mole Other paraffin dehydrogenations also show a similar high temperature requirements, e.g.:

n-Dodecane→dodecene-1+$H_2$
 $\Delta°$ F. @ 620° F. (600° K.) = +9.4 kcal./mole
n-Dodecane→dodecene-1+$H_2$
 $\Delta°$ F. @ 900° F. (755° K.) = +4.9 kcal./mole
n-Dodecane→dodecene-1+$H_2$
 $\Delta°$ F. @ 1160° F. (900° K.) = +0.4 kcal./mole If the hydrogenation is carried out at lower temperatures to avoid the cracking reaction and other side reactions resulting from high temperature utilization, then the free energy relationship becomes unfavorable and only limited conversions are obtained.

In order to overcome the foregoing limitations, it has also been proposed to employ supported metal catalysts, which are normally associated with hydrogenation and/or dehydrogenation activity, in the production of olefins by hydrogen transfer from hydrocarbon feedstocks to a hydrogen accepting olefin. While these supported metals, such as nickel and palladium, initially appeared to be practical, further use thereof was precluded due to these metals catalyzing high consumptions of ethylene by undesirable disproportionation reactions. Examples of such disproportionation reactions are:

Ethylene→ethane+coke
Ethylene→methane+coke

The supported metals utilized as catalysts have been found to convert such large amounts of the ethylene in the feed by disproportionation that there was little or none available for its function as the hydrogen acceptor. Consequently, the olefin formation resulting from the reaction was negligible.

It is an object of the present invention, therefore, to provide for the desired production of straight chain olefins from straight chain paraffins by means of hydrogen exchange causing a more favorable free energy of reaction at low temperatures. Other objects and advantages will be apparent from the subsequent disclosure.

The above objects are provided for in accordance with the present invention by a process which comprises reacting a hydrocarbon containing more than three carbon atoms with a hydrogen accepting olefin in the presence of a supported catalyst comprising a sulfide of a metal of group VIII or molybdenum sulfide, said catalyst being effective in transferring hydrogen from the hydrocarbon to the olefin thereby forming an alkane corresponding to said olefin and an olefin of three or more carbon atoms. Accordingly it has been observed that said desired production of straight chain olefins from straight chain paraffins is accomplished with a more favorable free energy of reaction, at low temperatures, by hydrogen exchange with a lower olefin, e.g., propylene and ethylene, and especially ethylene. For example, with ethylene:

Ethylene+n-dodecane→dodecene-1+ethane
 $\Delta°$ F. @ R.T. = −3.39 kcal./mole
Ethylene+n-dodecane→dodecene-1+ethane
 $\Delta°$ F. @ 400° K. = −3.6 kcal./mole
Ethylene+n-dodecane→dodecene-1+ethane
 $\Delta°$ F. @ 700° K. = −4.31 kcal./mole
Ethylene+n-hexane→trans hexene-2+ethane
 $\Delta°$ F. @ R.T. = −5.70 kcal./mole With free energies of this order of magnitude quite favorable equilibrium constants result at mild temperatures, e.g., for the reaction of n-dodecane with ethylene at 279° F. (400° K.) $\Delta°$ F. = −3.6 kcal./mole and the equilibrium constant becomes:

$$\frac{(\text{dodecene})(\text{ethane})}{(\text{dodecane})(\text{ethylene})} = 100 = K$$

at 800° F. (700° K.) K=22.

Thus, in accordance with the present invention, it is now possible to convert paraffins to the desired olefins in high conversions, at low temperature, and with high selectivity.

The process of the present invention has wide application to the conversion of various types of hydrocarbons to the related hydrocarbon having at least one different carbon-to-carbon linkage and a higher carbon-to-hydrogen ratio. The upper limits of the number of carbon atoms present in the hydrocarbon employed as starting material is determined only by the operational feasibility thereof. Thus the process of the present invention is applicable to both polymeric hydrocarbons, as well as monomeric hydrocarbons. With regard to the monomeric hydrocarbons, it is found that any acyclic aliphatic hydrocarbon can be suitably employed, the upper limit of the number of carbon atoms again being determined only by the operational feasibility thereof, but with the preferred upper limit being about 30 carbon atoms. While the aliphatic hydrocarbon employed must be essentially saturated in nature in order to be operable, it is found that the feed employed may also comprise saturated acyclic aliphatic hydrocarbons mixed with minor amounts of unsaturated acyclic aliphatic hydrocarbons. Thus, alkanes of at least three carbon atoms can be dehydrogenated to alkenes and/or alkadienes, e.g., isobutane can be dehydrogenated to isobutene, n-butane to butene-1, butene-2 and butadiene-1-3 and n-pentane to corresponding pentenes and pentadienes. In addition, as mentioned, mixtures of alkanes with minor amounts of alkenes can be dehydrogenated, for example, n-butane when mixed with minor amounts of butene-1 and/or -2 can be dehydrogenated to butene-1, butene-2, and butadiene-1-3.

In accordance with the present invention, ethylene is the preferred hydrogen accepting olefin for use in the process thereof. For convenience of terminology, the term "hydrogen accepting olefin" is employed herein to designate an olefin suitable for accepting hydrogen in a conversion of a particular compound as determined by application of the theory of free energy changes. Thermodynamically, it is the most suitable one because at any given temperature the free energy change of the conversion of ethylene to ethane is a lower positive or greater negative number than for the corresponding conversion of any other olefin. Ethylene has further considerable advantages for use in the present invention, in that it and its hydrogenation product ethane are less subject to cracking than the olefins of higher molecular weight. Similarly, ethylene is less subject to ready conversion by any other reaction in the presence of catalyst than high molecular weight olefins which may be converted to more highly unsaturated compounds or cracked material by reaction in the presence of the foregoing catalyst and under the reaction conditions normally employed.

Propylene is also a suitable olefin for use in many reactions in accordance with the present invention, particularly when a compound desired is a hydrocarbon having a relatively greater number of carbon atoms, e.g. six or more carbon atoms. The free energy change for propylene is about four kilocalories greater, i.e. more positive than for ethylene at temperatures in the range employed in the present invention. Next to ethylene, however, propylene is preferably employed, but any other olefin such as butene-1, butene-2, isobutene and normal or branched pentene, hexene, or higher olefin may be employed provided that it meets the criterion of an acceptable free energy change.

The olefin employed as hydrogen acceptor need not be charged to the reaction in pure form. Mixtures of olefins, e.g., a mixed ethylene-propylene stream may therefore be employed. The olefin may also be charged in admixture with hydrocarbons which are relatively inert under the reaction conditions, e.g., ethylene may be charged in admixture with methane and/or ethane. Since the effectiveness of the olefin as a hydrogen acceptor depends on the corresponding paraffin, the presence of the corresponding paraffin in the feed will tend to suppress this reaction and such paraffin is therefore preferably held to a relatively low concentration in the olefin charge stream. The olefin employed as hydrogen acceptor in the present process may be derived from any convenient source, e.g. thermal and catalytic cracking of petroleum hydrocarbons furnishes large amounts of olefins in most petroleum refineries. Ethylene may be recovered from cracked gases or may be produced and recovered by any of numerous known processes.

In accordance with the present invention, reaction is carried out over certain active hydrogenation-dehydrogenation type catalysts, i.e. a group VIII metal sulfide or molybdenum sulfide catalyst. As used herein, the term group VIII metal defines a group of metals consisting of platinum, palladium, and nickel. The catalyst of the present invention, i.e., the group VIII metal sulfides and molybdenum sulfide are truly selective in that the above desired objects relative to favorable free energy of reaction and disproportionation suppression are accomplished. Furthermore, the catalysts used in the process of the instant invention are found to be extremely stable and can be used for protracted periods of time without apparent loss of activity.

The catalysts used in the present invention are, of necessity, preferably supported on inert carriers of any of the readily available types. Examples of carrier materials which may be used as solid support components of the catalysts are the various aluminous and siliceous materials of natural or synthetic origin such as bauxite, aluminum oxide, activated alumina, kieselguhr, magnesium oxide, magnesium silicate, magnesium carbonate, barium sulfate, pumic, kaolin, activated carbon, clays, Carborundum, Alundum, and the like. The catalyst preferably contains from about 2 to 60 weight percent of the active material depending on the catalyst and desired conversion levels supported on a carrier of the type above described. The preferred sulfided catalyst is molybdenum sulfide, having the general composition 2 to 20 weight percent, preferably 5 to 15 weight percent, for example, 10 weight percent of molybdenum sulfide on a carrier of the type above described, for example, activated alumina, sulfided to saturation with $H_2$ and $H_2S$.

The conditions suitably employed in the process of the present invention depend on the particular compound to be converted, the compound selected as the hydrogen accepting olefin, the catalyst employed, as well as the hydrocarbon desired to be obtained as the principal product. In the conversion of saturated hydrocarbons to their corresponding olefins, the temperature required is generally between at least 500° F. and 1000° F., and preferably is in the range between 600° F. and 900° F., although higher temperatures may be utilized if desired. The higher temperatures are not objectionable as long as other undesirable changes are not effected. However, excessively high temperatures are not required in order to effect suitable dehydrogenation in the presence of a catalyst utilized in accordance with this invention and the hydrogen accepting olefin. The process is suitably carried out at various pressures of from subatmospheric to superatmospheric pressures, in either the liquid or the vapor phase depending on the particular hydrocarbons being employed, for example, the lower molecular weight feed, e.g. $C_3$–$C_{16}$ alkanes being more suitably reacted in the vapor phase. Although atmospheric pressure is suitable and is advantageous in most cases, other considerations such as factors which are involved in the separation or recovery of the hydrocarbon products from the reactor effluent stream make superatmospheric most desirable in some cases. Thus the pressure can be at any value at which reactants are sufficiently heated to a temperature at which the hydrocarbon is substantially thermally stable. The pressure employed is preferably in a range of between 1 and 12 atmospheres, but may be higher.

The residence time of the reactants at the selected reaction conditions also depends on the particular hydrocarbon reactant, the hydrogen accepting olefin in the reaction mixture, the catalyst utilized, the temperature and pressure employed, and the nature of the dehydrogenation product. In general, it should be at least about 3 seconds and usually it should not be over about 3 minutes. With most common reactants dehydrogenation is very rapid so that a residence time of from 5 to 20 seconds suffices and is, therefore, preferred.

The ratio of hydrogen accepting olefin to hydrocarbon to be converted in the present reaction, which may be designated as "hydrogen donor hydrocarbons," may be varied over a wide range. This ratio may be expressed by the mole ratio of the hydrogen accepting olefins to the hydrogen donor. The mole ratio of hydrogen accepting olefin to hydrogen donor employed may suitably vary from 0.15 to 1.5 and is preferably in a range between 0.25 and 0.55. In selecting a ratio of hydrogen accepting olefin to the hydrogen donor, it is generally preferred not to exceed a mole ratio of olefin to donor of about 1.0.

The particular apparatus used in carrying out the hydrogen transfer step forms no part of the present invention. The process is conveniently carried out in a fixed bed system similar to those well known in the art.

In applying the process of the present invention to the production of desirable olefins, e.g. butene, it is only necessary to pass proportioned mixtures of butane with ethylene through beds of this selected granular catalytic material which is contained in the reaction zone utilized. The reaction zone employed may suitably be a heated vessel or coil which is maintained at a temperature in the range set forth above, e.g. between about 500° F and 1000° F. The feed, i.e. the combined butane-ethylene feed is added to the reactor, preferably at a gas flow rate of about 150 v./v./hr. The feed of butane and ethylene is so adjusted that the feed comprises about 70 mole percent of butane and about 30 mole percent of ethylene. The mixture of butane and ethylene may be preheated if desired prior to its introduction into the reaction zone. The stream of butane and ethylene is maintained in the reactor at the foregoing temperatures for a period of from about three seconds to three minutes whereafter the reactor effluent is withdrawn and is suitably passed to a fractionator. The material introduced into the fractionator are fractionally distilled so as to recover desired fractions. Thus, minute quantities of methane and hydrogen formed during the reaction, as well as the ethane resulting from the hydrogen transfer and any unreacted ethylene, is separated from the desired hydrocarbon product. The total hydrocarbon product is suitably subjected to further workup including separation of uncoverted butane from said reaction products. This butane, so separated, may be recycled back to reaction zone, if desired. Similarly, the ethylene resulting from the separation may also be recycled for further use in the process, while the ethane component may be discarded fromthesystemoritmaybeproce-1nRnald
from the system or it may be processed for new use by introduction into a cracking zone which is operated at a temperature of approximately 1500° F. with a very short residence time to produce a mixture of ethane and ethylene. The ethylene so-produced thus may also be recycled back to the system for further use.

In order to indicate the novelty and utility of the present invention, the following examples are given of specific methods of operation of the process which employ the preferred conditions of temperature and pressure and flow rate, as well as preferred feedstock and catalyst. These examples are merely illustrative of results normally obtained and should not be construed as a limiting feature of the invention as various changes and modifications apparent to those skilled in the art may be made in reaction conditions employed.

In the following examples, sulfiding was carried out by first reducing the catalyst in a hydrogen flow overnight at 600° F., followed by five hours treatment at 550° F. in a 70:30 mole ratio of $H_2$ and $H_2S$.

EXAMPLE I

The following example is presented in order to illustrate that by sulfiding the supported Group VIII metal catalyst, disproportionation reactions are inhibited to a point that olefin formation becomes significantly favorable. In this example, the feed employed was a blend of 41 mole percent of ethylene and 59 mole percent of propane fed into the reaction zone at a feed rate of 150 v./v./hr. Said mixture was passed at atmospheric pressure and a temperature of 800° F. over a catalyst comprising 55 percent nickel on kieselguhr. The results of such experiment which are presented as the percentage yield of propene product and as the percentage of ethylene consumed illustrate a comparison of the use of a catalyst which is not sulfided with a catalyst which has been sulfided.

| Catalyst | Percent Yield of $C_3^=$ | Percent $C_2H_4$ Consumed |
|---|---|---|
| Catalyst Not Sulfided | 0 | 100 |
| Catalyst Sulfided | 10 | 20 |

It is obvious from the foregoing data that improved conversions to olefins and more efficient use of the ethylene employed are highly desirable benefits which are obtained by the use of a sulfided hydrogenation catalyst rather than a catalyst which was not sulfided.

EXAMPLE II

This example is presented in order to illustrate the proposition that the sulfided form of the catalyst actually exceeds the oxide form of the same metals in their ability to catalyze the transfer of hydrogen from a hydrocarbon to ethylene. In this example, a comparison was made of molybdenum oxide on alumina, a catalyst heretofore known in the art for use in the production of olefins by hydrogen transfer, with the same catalyst, but after sulfiding.

The runs were effected in a manner similar to the runs of Example I. In this example, a mixture of ethylene and propane was passed at atmospheric pressure over a catalyst having the composition set forth below and at the temperature set forth below. The feed rate employed was 145 v./v./hr. The percent yield of propene product obtained is also set forth below.

| Catalyst | Temp., °F. | Percent Yield of $C_3^=$ |
|---|---|---|
| 10% $MoO_3/Al_2O_3$ | 800 | 9 |
| | 900 | 15 |
| 10% $MoO_3/Al_2O_3$, sulfided | 800 | 14 |
| | 900 | 21 |

Upon studying the above presented data, it it apparent that not only are conversions to olefin product increased by sulfiding the catalyst, but also temperatures of approximately 100° F. lower can successfully be employed with the sulfided catalyst.

EXAMPLE III

The following example is presented in order to show, by comparison, the favorable application of this invention to a sulfided palladium catalyst. In this example, a mixture of ethylene and propane was passed at atmospheric pressure and a temperature of 800° F. over a catalyst comprising 5% palladium on alumina at a feed rate of about 150 v./v./hr. The feed employed was a blend of 41 mole percent ethylene and 59 mole percent propane. The results presented below show a comparison of a catalyst not sulfided with the catalyst which has been sulfided in accordance with the present invention.

| Catalyst | Percent Yield of $C_3^=$ | Percent $C_2H_4$ Consumption |
|---|---|---|
| Catalyst Not Sulfided | 0 | 100 |
| Catalyst Sulfided | 11 | 22 |

From the foregoing, the improved conversion to olefin product and the more efficient use of the ethylene is easily notable and further comment is deemed unnecessary in this regard.

EXAMPLE IV

In a manner similar to the preceding examples, a mixture of ethylene and normal butane similar to the mixtures employed above is passed at atmospheric pressure and a temperature of about 800° F. over a catalyst comprising aluminum oxide having deposited thereon a platinum catalyst which has been sulfided in accordance with the present invention.

EXAMPLE V

The following example was run in order to illustrate the necessity of employing supported catalysts.

In this illustrative experiment a run was effected employing conditions similar to those of Example II. Thus a feed comprising 41 mole percent of ethylene and 59 mole percent of propane was fed into the reaction zone at a feed rate of about 145 v./v./hr. Said feed was passed at atmospheric pressure and at a temperature of about 800° F. over a catalyst consisting essentially of unsupported molybdenum sulfide. The result of such run was a severe continual catalyst deterioration and plugging by the sulfur released by said catalyst. Little or no conversion to olefin product was observed.

The necessity of the use of the catalyst support is thus believed evident from such run.

It is to be understood that this invention is capable of many modifications and is not to be limited by the foregoing examples but only by the following claims.

What is claimed is:

1. The process which comprises reacting a hydrocarbon containing more than 3 carbon atoms with a hydrogen accepting olefin in the presence of a supported catalyst selected from the group consisting of a sulfide of a metal of group VIII and molybdenum sulfide, said catalyst being effective in transferring hydrogen from the hydrocarbon to the olefin thereby forming an alkane corresponding to said olefin, and an olefin of more than 3 carbon atoms.

2. The process of claim 1 in which the supported catalyst is platinum sulfide.

3. The process of claim 1 in which the supported catalyst is palladium sulfide.

4. The process of claim 1 in which the supported catalyst is nickel sulfide.

5. The process of claim 1 in which the supported catalyst is molybdenum sulfide.

6. The process of claim 1 in which the hydrogen accepting olefin is ethylene.

7. In a process for converting a first hydrocarbon containing at least three carbon atoms per molecule and containing non-aromatic carbon-to-hydrogen bonds into at least a second hydrocarbon having a higher carbon-to-hydrogen ratio which comprises contacting a mixture comprising said first hydrocarbon with a hydrogen accepting olefin having a lower carbon number than said first hydrocarbon in a reaction zone at a temperature of about 700 to 1000° F. to effect a carbon-to-hydrogen bond cleavage in said first hydrocarbon and conversion of at least part of said olefin to the corresponding paraffin and recovering said first hydrocarbon, the improvement which comprises effecting said contacting in the presence of a supported catalyst selected from the group consisting of a sulfide of a metal of group VIII and molybdenum sulfide.

8. The process of claim 7 in which the supported catalyst is platinum sulfide.

9. The process of claim 7 in which the supported catalyst is palladium sulfide.

10. The process of claim 7 in which the supported catalyst is nickel sulfide.

11. The process of claim 7 in which the supported catalyst is molybdenum sulfide.

12. A process for converting a first hydrocarbon containing from 3 to about 16 carbon atoms per molecule and containing non-aromatic carbon-to-hydrogen bonds into at least a second hydrocarbon having a higher carbon-to-hydrogen ratio, which comprises contacting a vapor mixture comprising said first hydrocarbon with ethylene in a reaction zone in the presence of a supported catalyst selected from the group consisting of sulfide of a metal of group VIII and molybdenum sulfide at a temperature of about 600–900° F. to effect a carbon-to-hydrogen bond cleavage in said first hydrocarbon and the conversion of at least part of said ethylene to ethane and recovering said first hydrocarbon.

13. The process of claim 12 in which the supported catalyst is platinum sulfide.

14. The process of claim 12 in which the supported catalyst is palladium sulfide.

15. The process of claim 12 in which the supported catalyst is nickel sulfide.

16. The process of claim 12 in which the supported catalyst is molybdenum sulfide.

17. The process of claim 12 in which the catalyst support is alumina.

References Cited by the Examiner

UNITED STATES PATENTS 3,106,590  10/1963  Bittner _____ 260—683.3

DELBERT E. GANTZ, *Primary Examiner.*

G. E. SCHMITKONS, *Assistant Examiner.*